United States Patent [19]

Shirodkar

[11] Patent Number: 4,957,972

[45] Date of Patent: Sep. 18, 1990

[54] BLENDS OF LINEAR LOW DENSITY ETHYLENE COPOLYMERS

[75] Inventor: Pradeep P. Shirodkar, Somerset, N.J.

[73] Assignee: Mobil Oil Corporation, New York, N.Y.

[21] Appl. No.: 266,957

[22] Filed: Nov. 3, 1988

[51] Int. Cl.$^5$ .................. C08L 23/20; C08L 23/18; C08L 23/08

[52] U.S. Cl. .................................................... 525/240

[58] Field of Search ........................................ 525/240

[56] References Cited

U.S. PATENT DOCUMENTS

| | | |
|---|---|---|
| 3,660,530 | 5/1972 | Hoblit et al. |
| 4,456,660 | 6/1984 | Columbo |
| 4,542,188 | 9/1985 | Van der Heijden ............... 525/240 |
| 4,565,847 | 1/1986 | Bahl et al. |
| 4,579,912 | 4/1986 | Canterino et al. |
| 4,588,650 | 5/1986 | Mientus et al. .................... 525/240 |
| 4,657,982 | 4/1987 | Breck et al. |
| 4,665,130 | 5/1987 | Hwo ................................... 525/222 |

OTHER PUBLICATIONS

Package Engineering; New Polyethylenes, 2/1980, pp. 39 and 40.

Plastic World, New Materials, 12/79, p. 86.

*Primary Examiner*—Carman J. Seccuro

*Attorney, Agent, or Firm*—Alexander J. McKillop; Charles J. Speciale

[57] ABSTRACT

Novel polymer blends are provided comprising a linear low density copolymer of ethylene with an olefin containing 4 to 10 carbon atoms (LLDPE) compounded with a minor amount of an at least partially isotactic, partially crystalline butene-1 polymer comprising at least about 80 wt. % of polymerized butene-1. The blends can be fabricated with better processability and reduced blocking into blown films having improved impact properties.

17 Claims, No Drawings

BLENDS OF LINEAR LOW DENSITY ETHYLENE COPOLYMERS

BACKGROUND OF THE INVENTION

1. Field of the Invention

This invention relates to novel compositions comprising a linear low density copolymer of ethylene and a minor amount of an olefin containing 4 to 10 carbon atoms (LLDPE), and to films of improved properties formed from such compositions. Also included in the invention is the process of forming blown films from such compositions which is accomplished with improved processability and less blocking.

2. Description of Related Art

The following information is disclosed in accordance with the terms of 37 CFR 1.56, 1.97 and 1.98.

U.S. Pat. No. 4,565,847, issued Jan. 21, 1986 to S. K. Bahl et al., discloses blends of LLDPE, polypropylene (PP) or ethylene-propylene copolymer, and ethylene-propylene-diene monomer rubber (EPDM), which are stated to form films having improved MD tear strength and dart drop impact properties.

U.S. Pat. No. 4,579,912, issued Apr. 1, 1986 to P. J. Canterino et al., teaches blends of LLDPE and an aromatic polymer, e.g., polystyrene, which are stated to form films of improved MD tear strength and higher stiffness compared to LLDPE alone.

U.S. Pat. No. 4,657,982, issued Apr. 14, 1987 to A. K. Breck et al., discloses film-forming blends of a linear copolymer of ethylene and a $C_4$ to $C_8$ alpha-olefin, and two "polybutenes," one having a number average molecular weight of 500 to 1500 and the other a number average molecular weight of 1700 to 10,000.

U.S. Pat. No. 4,456,660, issued June 26, 1984 to E.A. Columbo, teaches blends of conventional branched low density polyethylene (LDPE) and polybutene-1 used to prepare laminated films with unblended LDPE which are stated to be tough and to have good tear resistance.

U.S. Pat. No. 3,660,530 issued May 2, 1972 to Hoblit et al., discloses blends of high density polyethylene and block copolymers of polyethylene and a polymer of butene-1 which are stated to have improved stress crack resistance.

SUMMARY OF THE INVENTION

In accordance with this invention, novel polymer blends are provided comprising a linear low density copolymer of ethylene with an olefin containing 4 to 10 carbon atoms (LLDPE), compounded with a minor amount of an at least partially isotactic, partially crystalline butene-1 polymer comprising at least about 80 wt. % of polymerized butene-1. The blends can be fabricated with better processability and reduced blocking into blown films having improved impact properties.

DESCRIPTION OF PREFERRED EMBODIMENTS

The linear low density ethylene copolymers (LLDPE) of this invention are linear copolymers of ethylene and a minor amount, preferably about 2 to 10 wt. %, of an olefin, preferably a 1-olefin, containing 4 to 10 carbon atoms and having a density of about 0.9 to 0.94, a melting point of about 110° to 130° C., and a melt index of about 0.2 to 10. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698, or by relatively high pressure methods, as disclosed, for example, in U.S. Pat. Nos. 4,405,774 and 4,530,983.

The butene-1 polymers contemplated under this invention are at least partially isotactic, partially crystalline polymers comprising at least 80 wt. %, preferably at least 90 wt. % of polymerized butene-1. These polymers include homopolymers of butene-1 and copolymers of at least about 80 wt. % of butene-1 and up to about 20 wt. % of at least one polymerized comonomer, e.g., an olefin, preferably a 1-olefin, containing 2 to about 10 carbon atoms, and preferably have a number average molecular weight of at least about 25,000, a density of from about 0.890 to 0.920, and a melt index of from about 0.1 to 40, (ASTM condition E). Some of these polymers are described in the article on "Polymers of Higher Olefins" in Kirk-Othmer, *Encyclopedia of Chemical Technology*, Third Edition, Vol. 16, Wiley-Interscience, 1981, pages 470–477. The polymers may be prepared using a Ziegler-Natta type catalyst as described for example in U.S. Pat. No. 3,362,940 or the foregoing Kirk-Othmer article. In general, the butene-1 polymers in unblended form are capable of being formed into shaped articles such as films.

The blends of LLDPE and butene-1 polymer may be prepared using any of various methods known in the art. For example, pellets of the two polymers may be dry blended and the blend added directly to a blown film extruder, e.g., a Sterling extruder, to produce films having a thickness, for example, of about 0.5 to 5 mils.

The polymer blends of this invention contain a minor amount, i.e., under 50 wt. % of the butene-1 polymer based on the combined weight of LLDPE and butene-1 polymer. Preferably, the blend contains about 1 to 25 wt. %, more preferably, about 2 to 10 wt. % of butene-1 polymer, based on the combined weight of LLPDE and butene-1 polymer. In addition to the polymer components, the blend may also contain any of various additives conventionally added to polymer compositions for different purposes, e.g. lubricants such as microtalc, stabilizers, compatibilizers, pigments, etc.

The following examples further illustrate the invention.

COMPARATIVE EXAMPLES A and B AND EXAMPLES 1 to 4

Films of 1.0 and 1.5 mils nominal gauge thickness were prepared from Mobil NTA-101 LLDPE, which is a linear low density copolymer of ethylene and about 6 wt. % of 1-hexene having a density of about 0.918, a melting point of about 125° C. and a melt index of about 1 (Comparative Examples A and B), the foregoing Mobil NTA-101 blended with 5 wt. % of Shell DP8310, which is a copolymer of about 94 wt. % of polymerized butene-1 and about 6 wt. % of polymerized ethylene, having a density of about 0.895, a melt index of about 3.0 and a number average molecular weight of about 50,000 (Examples 1 and 2), and the foregoing Mobil NTA-101 blended with 5 wt. % of Shell PBO400 polybutene-1 (a butene-1 homopolymer) having a density of about 0.915, a melt index of about 20, and a number average molecular weight of about 40,000 (Examples 3 and 4). The polymer blends of Examples 1 to 4 were prepared by dry blending the pellets and the wt. % of butene-1 polymer in these blends was based on the combined weight of the two polymers. The Mobil NTA-101 LLDPE in each of the examples contained 5000 ppm of microtalc.

The films were made in a 2½ inch Sterling blown film extruder under the following fabrication conditions: BUR (blow up ratio) of 2.5, production rate of 150 lb/hr, die gap of 80 mils, and a 6 inch die.

The table shows the RPM, screw tip pressure and screw amperes at which the extruder operated and, the Spencer Impact (ASTM D3420), Dart Drop $F_{50}$ Impact (ASTM D1709), and Induced Blocking Force (ASTM D3354) of the films prepared in the various examples.

TABLE

| Example | RPM | Screw Tip Press. psig | Screw Amperes | Nominal Gauge mils | Spencer Impact gms/mil | Dart Drop $F_{50}$ gms | Induced Blocking gms |
|---|---|---|---|---|---|---|---|
| A | 67.4 | 3090 | 46 | 1.0 | 763 | 175 | 85.1 |
| B | 67.4 | 3090 | 46 | 1.5 | 633 | 238 | 76.6 |
| 1 | 87.0 | 2650 | 31 | 1.0 | 1780 | 206 | 68.2 |
| 2 | 87.0 | 2650 | 31 | 1.5 | 1330 | 256 | 54.8 |
| 3 | 95.9 | 2680 | 29.5 | 1.0 | 1770 | 210 | 62.9 |
| 4 | 95.9 | 2680 | 29.5 | 1.5 | 924 | 256 | 39.9 |

The results shown in the table indicate that improved Spencer Impact, Dart Drop Impact and antiblocking properties were obtained with the films of Examples 1 to 4 prepared from blends of LLDPE with 5% of a butene-1 polymer as previously defined, as compared with the films of Comparative Examples A and B of equivalent thickness prepared from the same LLDPE not containing any butene-1 polymer. Moreover, these improved properties were accompanied by a superiority of processability in producing the butene-1 polymer containing films of Examples 1 to 4 as compared with the films of Comparative Examples A and B, indicated by lower values of screw tip pressure and screw amperes.

I claim:

1. A polymer blend comprising polymers consisting of a linear low density copolymer of ethylene with an olefin containing 4 to 10 carbon atoms and about 2 to 10 wt. % of an at least partially isotactic, partially crystalline butene-1 polymer comprising at least about 80 wt. % of polymerized butene-1.

2. The blend of claim 1 wherein said ethylene copolymer contains about 2 to 10 wt. % of said olefin in polymerized form.

3. The blend of claim 1 wherein said olefin is a 1-olefin.

4. The blend of claim 3 wherein said 1-olefin is 1-butene, 1-hexene, or 1-octene.

5. The blend of claim 1 wherein said ethylene copolymer has a density of about 0.9 to 0.94, a melting point of about 110° to 130° C., and a melt index of about 0.2 to 10.

6. The blend of claim 1 wherein said butene-1 polymer has a number average molecular weight of at least about 25,000.

7. The blend of claim 6 wherein said butene-1 polymer is a homopolymer of butene-1.

8. The blend of claim 6 wherein said butene-1 polymer is a copolymer of butene-1 and ethylene.

9. The blend of claim 1 wherein said butene-1 polymer has a density of from about 0.890 to 0.920 and a melt index of from about 0.1 to 40.

10. A film composed of the blend of claim 1.

11. A film composed of the blend of claim 4.

12. A film composed of the blend of claim 6.

13. A film composed of the blend of claim 5.

14. A process of extruding the blend of claim 1 into a blown film.

15. A process of extruding the blend of claim 4 into a blown film.

16. A process of extruding the blend of claim 6 into a blown film.

17. The blend of claim 1 wherein said butene-1 polymer in unblended form is capable of being formed into shaped articles.

* * * * *